July 9, 1940.  W. D. HAZLETT  2,206,895
NAVIGATION INSTRUMENT
Original Filed Feb. 13, 1937
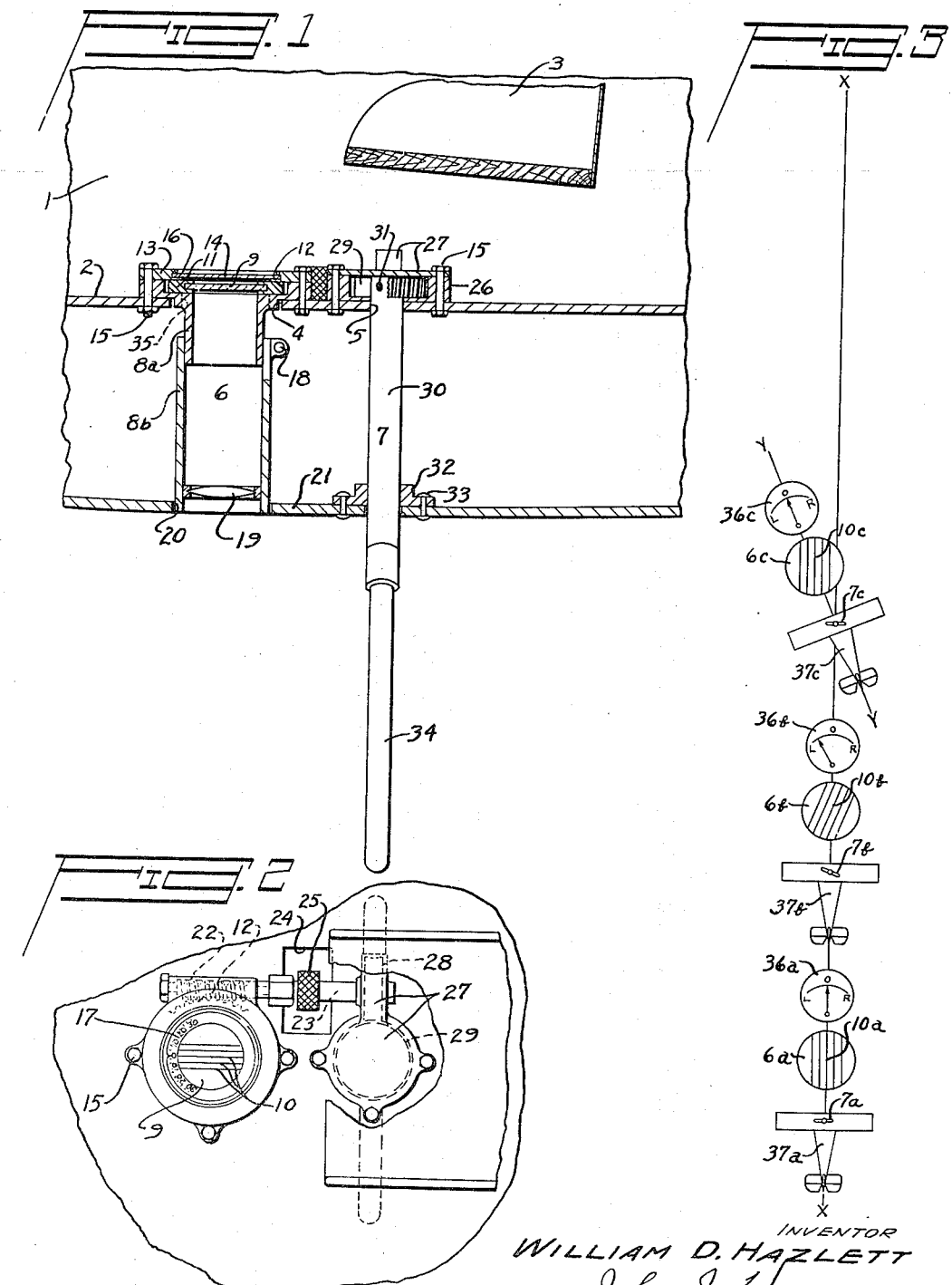
INVENTOR
WILLIAM D. HAZLETT
BY
ATTORNEYS Patented July 9, 1940

2,206,895

UNITED STATES PATENT OFFICE 2,206,895

NAVIGATION INSTRUMENT

William D. Hazlett, Dayton, Ohio

Application February 13, 1937, Serial No. 125,632
Renewed March 11, 1940

4 Claims. (Cl. 250—11)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to improvements in the navigation of aircraft. It is particularly adapted to aircraft equipped with radio receiving apparatus and the like wherein there is a movable loop aerial and the aircraft is further provided with a drift meter.

My invention has for its principal object interconnection of the aforesaid loop aerial and drift meter such that drift correction automatically returns the aircraft to a true line of flight coincident with a predetermined fixed course in azimuth.

With the foregoing and other objects in view, which will appear as the description proceeds, the invention consists of certain new and novel improvements in navigation instruments which will be hereinafter more fully illustrated in the accompanying drawing and more particularly pointed out in the appended claims.

Referring to the drawing, in which numerals of like character designate similar parts throughout the several claims:

Figure 1 is a cross-sectional view of my invention.

Figure 2 is a plan elevation of Figure 1.

Figure 3 is a diagrammatic representation of the operation of my invention.

In Figures 1 and 2, a fuselage 1 is provided with a floor 2 and a co-pilot's seat 3. In the event that an automatic pilot is installed in the fuselage 1, a single pilot's seat may be installed. Openings 4 and 5, in the floor 2, permit installation of a drift meter 6 and a loop portion 7 of a radio direction finder, respectively. The drift meter 6 is provided with an upper housing 8a and a lower housing 8b. A ground glass screen 9, provided with grid lines 10, is fixed to a freely rotatable frame 11, having at its periphery gear teeth 12. A cover plate 13 and glass 14 are secured to the top portion of the upper housing 8a by means of bolts 15. An overhanging inner portion 16, of the cover plate 13, is provided with character-marked angular graduations 17 for indicating exact angular deviation of the ground glass screen 9 fixed to the frame 11, with reference to the upper housing 8a and inner portion 16, which latter parts bear a predetermined fixed relationship to the longitudinal axis of the fuselage 1 and therefore to the floor 2. The view finder 6 is further provided with a lower housing 8b, a clamping bolt 18 and lens 19. A cut-out 20 is provided in the fuselage bottom 21 for downward projection of the lower housing 8b.

In order to accomplish angular adjustment of the ground glass screen 9, the upper housing 8a is provided with a worm gear 22 adapted to mesh with the gear teeth 12. The worm gear 22 is fixed to a driving shaft 23 which projects rearward of the upper housing 8a. A cut-out 24 in the floor 2 permits installation of a knob 25 upon the driving shaft 23. By bending forward, the co-pilot or pilot may readily bring the ground glass screen into desired alignment with moving objects upon the ground in a manner described in detail under operation of my invention.

Immediately to the rear of the knob 25, the driving shaft 23 enters a housing 26, of the loop 7. The housing 26 is provided with a cover plate 27 to permit installation of worm gear 28, fixed to the aft extremity of the driving shaft 23, and arranged to operably engage a second horizontally disposed gear 29. A driving stem 30, of the loop 7, is fixed to the gear 29 by means of a pin 31. The lower end of the driving stem 30 is journaled to a bearing block 32 fixed to the fuselage bottom 21 by means of rivets 33. The lower extremity of the loop 7 is provided with a conventional loop portion 34. It should be noted that the gearing ratio obtaining between gear teeth 12 and worm gear 22 and worm gears 28 and 29 is such that equi-angular turning of the ground glass screen 9 will produce like and similar angular turning of the driving stem 30.

A second embodiment of my invention may be described without additional figures. Referring to Figure 1, if the upper housing 8a be separated into an inner and an outer portion by means of a cylindrical cut 35 and the inner portion of the upper housing 8a fixedly secured to the frame 11, rotation of the knob 25 will cause like rotation of the ground glass screen 9, the lower housing 8b, and the lens 19. Through simple clamping of the loop portion 34 directly to the bottom of the lower housing 8b, identically the same effect as that produced by the original structure of Figures 1 and 2 will be effected by turning the knob 25.

Figure 3 is a diagrammatic representation of the operation of my invention during flight. The drift meter 6, the loop portion 7 of a radio direction finder of any well known construction, particularly of the bi-lateral type, having associated therewith a zero center indicator 36, the zero position of which corresponds to the loop at right angles to the longitudinal axis Y—Y of an airplane 37 carrying the same, are shown in progressing positions 6a, 7a, 36a and 37a; then 6b, 7b, 36b and 37b; then 6c, 7c, 36c and 37c; respectively. The indicator 36 is provided with the conventional "on station" or zero indication "0," left deviation indication "L" and right deviation indication "R."

In position 37a, an airplane is represented as traveling the fixed course in azimuth indicated by the axis x—x. From the loop position 7a and the reading of the indicator position 36a it is obvious that the sending station also lies upon the axis x—x. The above may be effected by automatic pilot means or by use of a pilot and a co-pilot. In glancing at the drift meter position 6a, the non-course-flying pilot notes misalignment of ground object passage along the grid lines 10a. He immediately turns the drift meter in the appropriate direction until true drift is indicated, as shown in 10b. During the foregoing operation, the airplane will progress to position 37b. It should be noted that while the latter is still "on course," both loop and drift meter have turned in the appropriate direction. In order that the loop be immediately returned to a position at right angles to the fixed course in azimuth, the airplane as a unit is turned in an opposite direction to an extent exactly equalling the angular difference represented between drift meter positions 6a and 6b. During the foregoing operation, the airplane will have still further progressed to position 37c at which time the drift meter will have assumed position 6c and ground objects observed therein will pass parallel to the grid lines 10a; the pointer of the indicator in position 36c will indicate "on course;" and the airplane as a whole will progress in a path coincident with the axis x—x.

Although the description is specific to the illustrations in the drawing, it is to be understood that there may be numerous departures therefrom which will still be within the field and scope of the invention, so that I do not wish to be restricted thereto, but only in so far as the appended claims are so limited.

What I claim as new is:

1. The combination with a directional radio loop, of a drift meter having a rotatable ground glass screen marked with grid lines, a scale for measuring the amount of rotation of said screen and means operatively connecting said screen and said loop for simultaneous rotation thereof in the same direction.

2. In combination with a radio directional finder having a directional loop and a visual zero center type indicator, a drift meter having a rotatable ground glass screen marked with grid lines, a scale for measuring the amount of rotation of said screen and means operatively connecting said screen and said loop for simultaneous rotation thereof in the same direction.

3. The combination with a direction indicating means having a rotatable loop aerial, of separate drift indicating means having a rotatable drift measuring element, and means operably connecting said loop aerial and said drift measuring element for simultaneous rotation thereof as a function of change of drift angle.

4. The combination with a direction indicating means having a rotatable loop aerial, of separate drift indicating means having a rotatable drift measuring element, and means operably connecting said loop aerial and said drift measuring element for simultaneous rotation thereof in direct proportion to change of drift angle.

WILLIAM D. HAZLETT.